(12) United States Patent
Zhou et al.

(10) Patent No.: US 9,842,117 B1
(45) Date of Patent: Dec. 12, 2017

(54) MANAGING REPLICATION OF FILE SYSTEMS

(71) Applicant: EMC Corporation, Hopkinton, MA (US)

(72) Inventors: Yingchao Zhou, Beijing (CN); Jean-Pierre Bono, Westborough, MA (US); Changxin Liu, Shanghai (CN); William C. Davenport, Burlington, MA (US); Philippe Armangau, Acton, MA (US); Jia Zhai, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 283 days.

(21) Appl. No.: 14/584,464

(22) Filed: Dec. 29, 2014

(51) Int. Cl.
*G06F 17/00* (2006.01)
*G06F 17/30* (2006.01)

(52) U.S. Cl.
CPC .. *G06F 17/30174* (2013.01); *G06F 17/30088* (2013.01)

(58) Field of Classification Search
CPC ............... G06F 17/30174; G06F 17/30088
USPC .......................................... 707/639
See application file for complete search history.

(56) References Cited

U.S. PATENT DOCUMENTS

| | | | | |
|---|---|---|---|---|
| 6,571,351 B1* | 5/2003 | Mitaru | ................ | G06F 11/1076 711/163 |
| 7,631,155 B1* | 12/2009 | Bono | .................... | G06F 3/0608 707/999.202 |
| 7,694,191 B1* | 4/2010 | Bono | .................... | G06F 11/004 714/48 |
| 8,037,345 B1* | 10/2011 | Iyer | ..................... | G06F 11/1004 714/20 |
| 8,566,371 B1* | 10/2013 | Bono | ................ | G06F 17/30079 707/822 |
| 2015/0121131 A1* | 4/2015 | Kiselev | ............... | H03M 13/154 714/6.23 |

OTHER PUBLICATIONS

Lagar-Cavilla, H. Andrés, et al., "SnowFlock: Virtual Machine Cloning as a First-Class Cloud Primitive", ACM Transactions on Computer Systems, vol. 29, No. 1, Article 2, 45 pages.*
Microsoft Computer Dictionary, 5th Edition, Microsoft Press, Redmond, WA, © 2002, p. 317.*

* cited by examiner

*Primary Examiner* — Robert Stevens
(74) *Attorney, Agent, or Firm* — Krishnendu Gupta; Deepika Bhayana

(57) ABSTRACT

A method is used in managing replication of file systems. Metadata of a set of slices of a file system is updated upon performing an operation on a slice of the file system. The file system includes the set of slices. The metadata of the set of slices is used for recovering the file system.

20 Claims, 9 Drawing Sheets

MANAGING REPLICATION OF FILE SYSTEMS

BACKGROUND

Technical Field

This application relates to managing replication of file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

File-based data storage systems include programming and hardware structures to provide file-based access to file systems. File-based data storage systems are sometimes referred to as Network Attached Storage or NAS systems. Such systems may support NFS (Network File System), CIFS (Common Internet File System), SMB (Server Message Block), and/or other file-based protocols. With file-based protocols, host computers (hosts) perform read and write operations to files by specifying particular file systems, paths, and file names. Internally to the data storage system, file system directories map the files specified by host commands to particular sets of blocks on internal volumes, which themselves are derived from disk drives or electronic flash drives. The data storage system accesses the mapped locations and performs the requested reads or writes. An example of a file-based data storage system is the Celerra® system and VNX® system from EMC Corporation of Hopkinton, Mass.

Data storage systems may utilize a file-based representation of block-oriented storage objects that are exposed to external users, such as host computers accessing the data storage system via a network. For example, a logical unit of storage or LUN is a block-oriented storage object visible as a block-oriented storage device to a host computer. Internally, however, the storage system may map the LUN into a file of an internal file system, and then manage access and other aspects of the LUN by corresponding operations on the mapped file. This organization can help enhance efficiency of processing storage operations. Additionally, in current systems employing virtual computing technology, units of virtualized storage for virtual machines may be represented as files of a distributed file system used by a host computer and one or more network-attached storage (NAS) systems. Within a host, accessing a virtualized storage unit requires a mapping to a file of the distributed file system, and within the storage system the file is mapped to underlying physical storage that contains the data of the virtualized storage unit. This mapping may be a multi-level mapping that may include use of a separate internal file system. Both the distributed file system and the internal file system may be described as "hosting" the virtualized storage units.

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Some data storage systems implement snapshot technology to protect the data they store. For example, such a data storage system may present a file system to a client machine. The client machine accesses the file system and can make changes to its contents over time. To protect the file system and its state at various points in time, the data storage system may implement a snapshot policy and take snapshots, or "snaps," of the file system at regular intervals or in response to user commands or particular events. Each snapshot provides a point-in-time version of the file system which users of client machines can access to restore from a previous version of the file system.

SUMMARY OF THE INVENTION

A method is used in managing replication of file systems. Metadata of a set of slices of a file system is updated upon performing an operation on a slice of the file system. The file system includes the set of slices. The metadata of the set of slices is used for recovering the file system.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
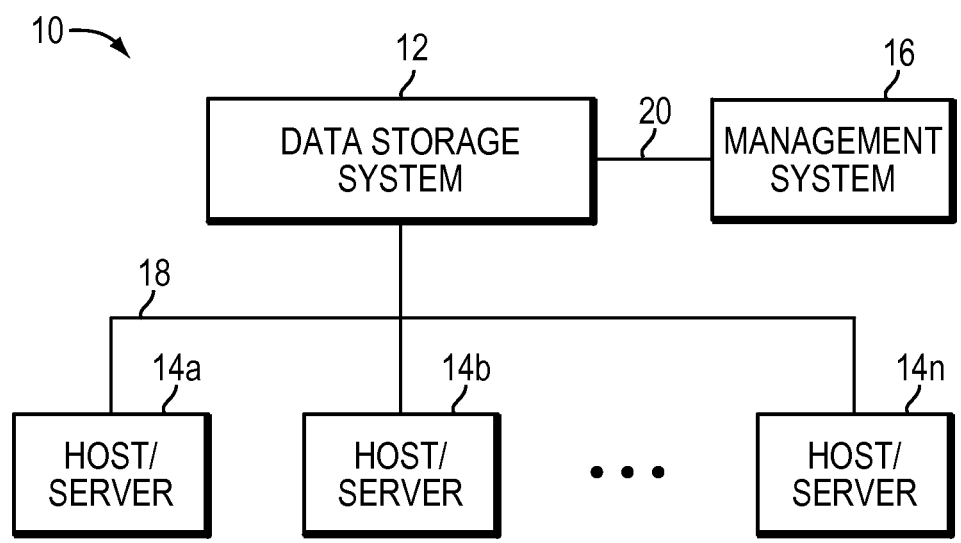
FIGS. 1-3 are examples of an embodiment of a computer system that may utilize the techniques described herein.

Described below is a technique for use in managing replication of file systems, which technique may be used to provide, among other things, updating metadata of a set of slices of a file system upon performing an operation on a slice of the file system, where the file system includes the set of slices, and using the metadata of the set of slices for recovering the file system.

Generally, a storage pool is a collection of storage that is provisioned for a logical unit. A storage pool may be a collection of disks, which may include disks of different types. Storage pools may further be subdivided into slices; for example, a 1 gigabyte (GB) slice may be the allocation element for a logical unit. Further, a slice may be 256 megabytes (MB) in size. A pool may include a set of storage tiers. A storage tier may include storage devices of similar or same performance capabilities and cost. However, a pool may have storage devices of different performance capabilities and costs. Both pool and storage tier contain slices. A slice may be considered the smallest element that can be tracked and moved. A storage tier or a storage pool may be a collection of storage containers. A storage container may be a unit of storage including a set of storage extents. A storage extent is a logical contiguous area of storage reserved for a user requesting the storage space.

A disk may be a physical disk within the storage system. A LUN may be a logical unit number which is an identifier for a Logical Unit. Each slice of data may have a mapping to the location of the physical drive where it starts and ends.

Based on configuration of a storage pool and the type of a logical unit of the storage pool, slices may be provisioned for the logical unit either dynamically at the time the logical unit requires slices for allocating storage space or at the time the logical unit is created. Allocating a slice to a logical unit is referred to as provisioning the slice to the logical unit. Thus, a provisioned slice allocated to a logical unit has an owner which may be a file system represented by the logical unit. When a provisioned slice is written to by a host system and includes user data, the provisioned slice is referred to as an allocated provisioned slice. When a provisioned slice has not been written to by a host system and does not include any user data, the provisioned slice is referred to as an unused provisioned slice. A slice residing in a storage pool which is available for provisioning to a logical unit is referred to as an un-provisioned slice.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

File system mapping logic in a storage system provides a thin provisioning service by adding fixed sized slices to a file system when the file system needs storage space to write data. In such a case, when a file system requires a slice, the file system sends a request to provision the slice to a slice manager component of a storage system. A slice request framework manages requests to provision slices.

Generally, a slice request framework in a data storage system manages provisioning of slices to a mapped LUN associated with a file system such that the slice request framework adds a slice to the file system or a volume of the file system when the slice request framework receives a request to provision the slice. A file system may need to provision a slice when the file system requires storage space for writing data.

Thus, as described above herein, virtual address space of a file system may be apportioned into fixed sized sections or chunks, each chunk being a slice. A file system may dynamically add or remove slices based on the amount of space consumed by the file system. Further, a file system manages mapping information for mapping its virtual address space with physical location of slices on a storage device. Further, storage pool from which slices are allocated to a file system manages a slice allocation table (also referred to herein as "SAT") for the file system to track each slice used by the file system and residing in the storage pool.

Conventionally, operations performed on a slice (such as allocation, deallocation, addition, deletion) are managed by a set of data structures such as a process object. In such a conventional system, a process object performs a slice operation and manages updates to information included in a slice allocation table and mapping information of a file system. In such a conventional system, a process object ensures that information included in a SAT of a storage pool and mapping information stored in a file system is consistent after the slice operation is performed by the process object. In such a conventional system, a process object maintains a part of information in a persistent storage for recovering a file system after a reboot of a storage system. Thus, in such a conventional system, if a storage system reboots due to a failover during the time when a slice operation is being performed on a slice of a file system and the slice operation has not completed, a process object associated with the slice operation retries the slice operation after the storage system has rebooted and attempts to recover the file system and the slice to a consistent state. Thus, in such a conventional system, the state of a single file system may be recovered by a set of process objects. However, in such a conventional system, if a user creates a snapshot copy of a file system or setup a replication session for the file system for creating remote copies of the file system, process objects are not created or used for the snapshot copy of the file system or a remote copy of the file system created during the replication session. Thus, in such a conventional system, without a process object an inconsistency is introduced between a SAT and mapping information of a file system when a storage system reboots during a slice operation. Thus, in such a conventional system, for example, when a slice is removed from a file system by a slice remove operation, the slice remove operation is performed in two steps where in the first step the slice is marked as a vacant slice (also referred to herein as "un-provisioned") in file system's mapping information and in the second step the slice is marked as a free slice in a SAT. Thus, in such a conventional system, if a replication failover occurs between the first and second steps, the slice in the example described above herein will be marked as a used slice in a remote copy of the file system but marked as a free slice in a SAT for the file system thereby indicating inaccurately that the slice has been lost in mapping information of the remote file system after the replication failover. Thus, in such a conventional system, in order to make the state of a snapshot copy of a file system or remote copy of the file system consistent, each entry of a SAT is evaluated along with entire file system mapping information for eliminating any inconsistency between information included in the SAT and the mapping information of the file system thereby consuming significant amount of time. As a result, in such a conventional system, it may be difficult or impossible for a storage system to recover a file system after a reboot of the storage system thereby causing a data loss and/or data unavailable situation. Further, in such a conventional system, entire contents of a slice allocation table stored on a storage device is retrieved and loaded into a memory of a storage system thereby consuming a large amount of storage resources. Thus, in such a conventional system, after entire contents of a SAT is loaded into a memory of a storage system, a slice manager evaluates the contents and search for a free and/or intermittent slice every time the storage system reboots thereby consuming a large amount of storage system resources.

By contrast, in at least some implementations in accordance with the technique as described herein, the current technique uses a bitmap to track each slice on which a slice operation is being performed such that a bit of the bitmap corresponding to a slice is set before a slice operation is started and updated after the slice operation finishes. Thus, in at least one embodiment of the current technique, when a snapshot copy of a file system is mounted or a remote copy of the file system is mounted after a storage system reboots due to a failover, the bitmap is evaluated and a set of slices on which slice operations haven't finished before the failover of the storage system are identified such that the storage system may roll forward or roll back such slice operations in order to make the state of the file system consistent. Thus, in least one embodiment of the current technique, a small-sized data structure (e.g., a bitmap) is evaluated for identifying slices that are in intermittent state by scanning bits of the bitmap thereby providing a capability to make a snapshot copy or remote cope of a file system consistent after a reboot without having to evaluate each entry of a SAT or loading each entry of the SAT in a memory of a storage system. Thus, in least one embodiment of the current technique, disk slice bitmaps (e.g., free slice bitmap, uncommit slice bitmap, intermittent slice bitmap) are evaluated efficiently to locate target slices for evaluation such that only the target slices are loaded into a memory of a storage system.

In at least some implementations in accordance with the current technique as described herein, the use of the managing replication of file systems technique can provide one or more of the following advantages: improving efficiency of a data storage system by efficiently processing slices of a file system, improving performance of a recovery process by maintaining a bitmap for slices that are in an intermittent state for recovering file systems after a failover, and reducing unavailability of a file system by efficiently recovering the file system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
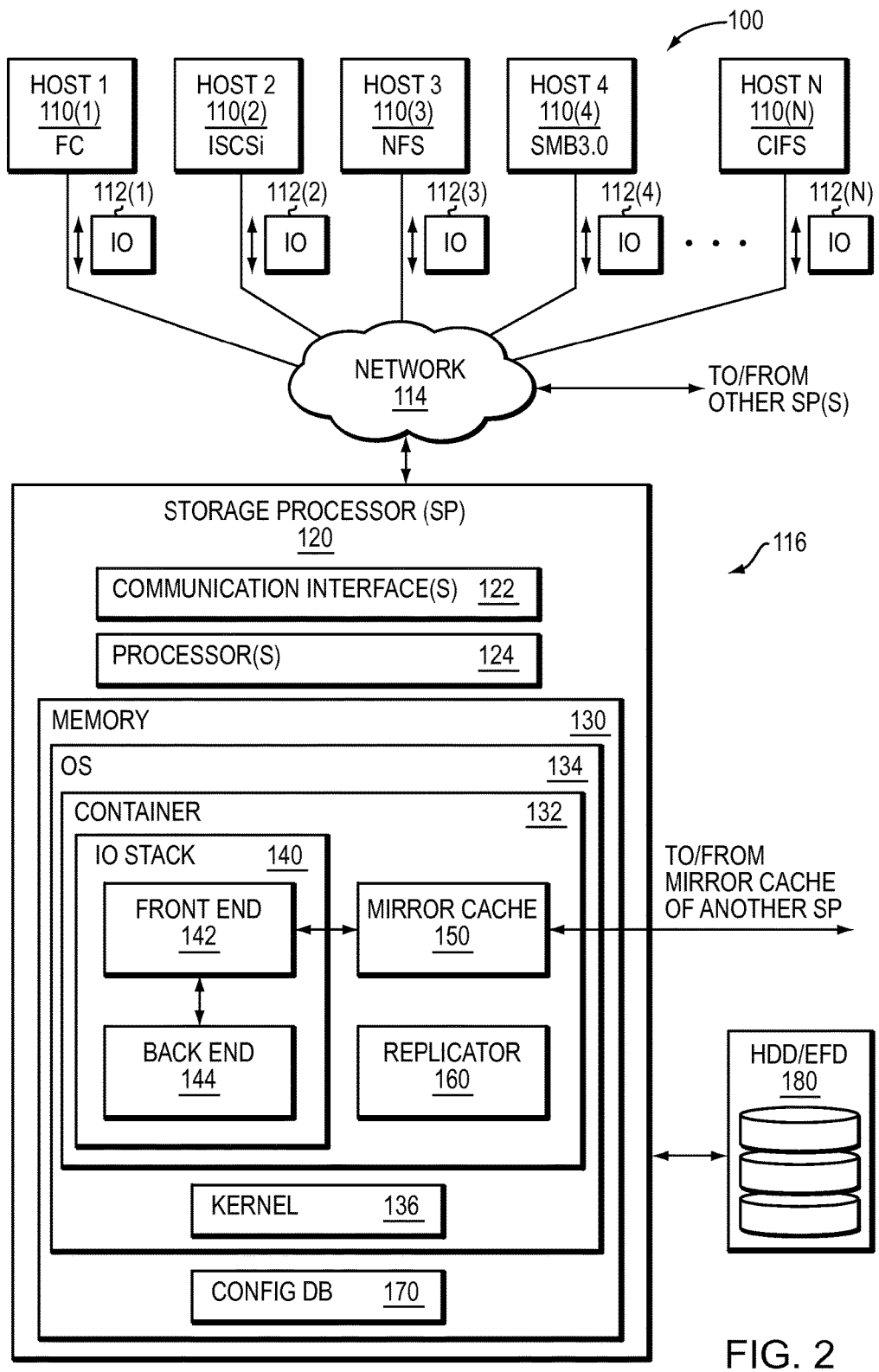

Referring now to FIG. 2, shown is an example of an embodiment of a computer system that may be used in connection with performing the technique or techniques described herein. FIG. 2 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 2, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated user space execution context within the operating system 134. In various examples, the memory 130 may include multiple containers like the container 132, with each container providing its own isolated user space instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 2, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 2 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 3:
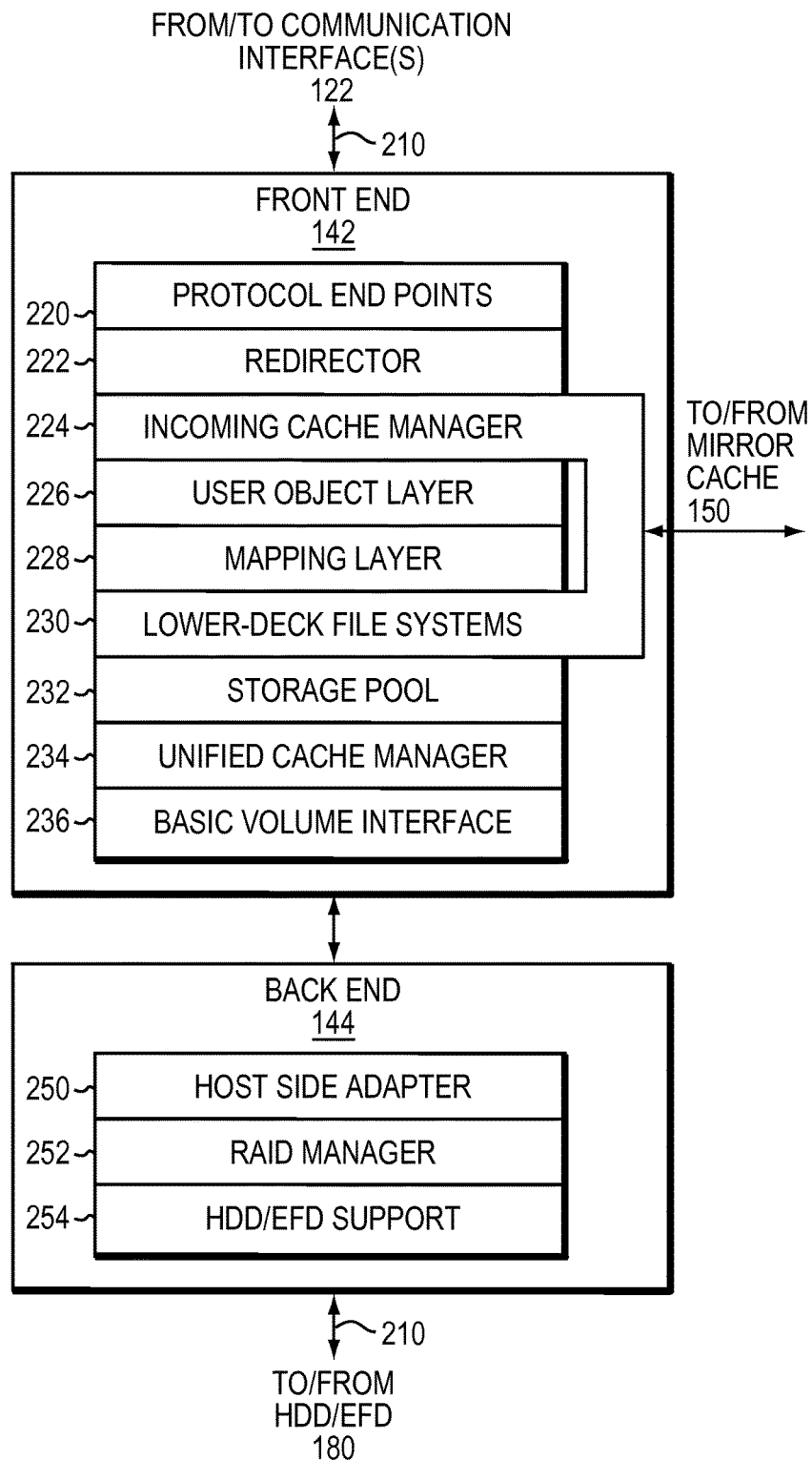

FIG. 3 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 4:
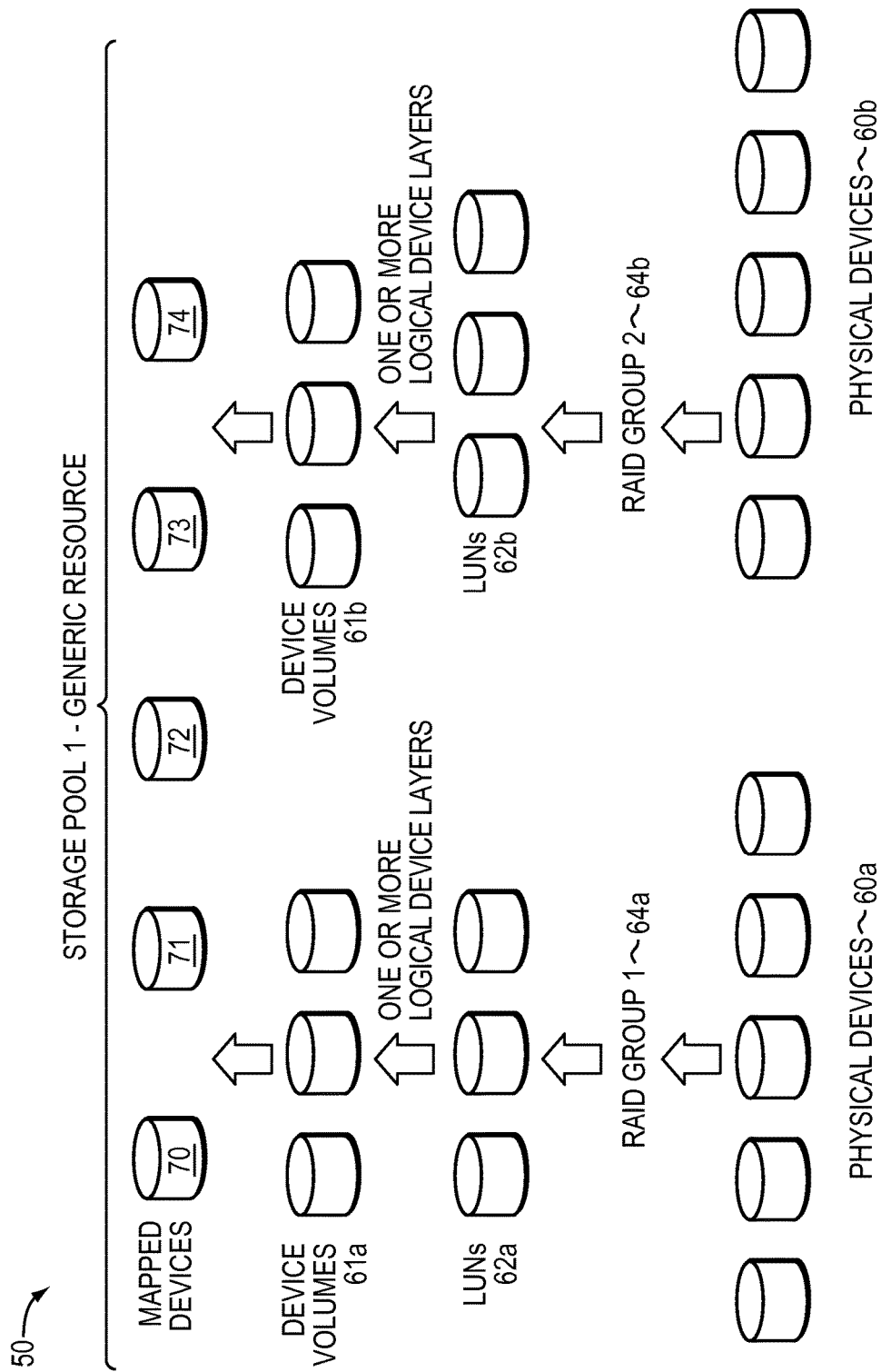
FIG. 4 is an example illustrating storage device layout.

Referring to FIG. 4, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 5:
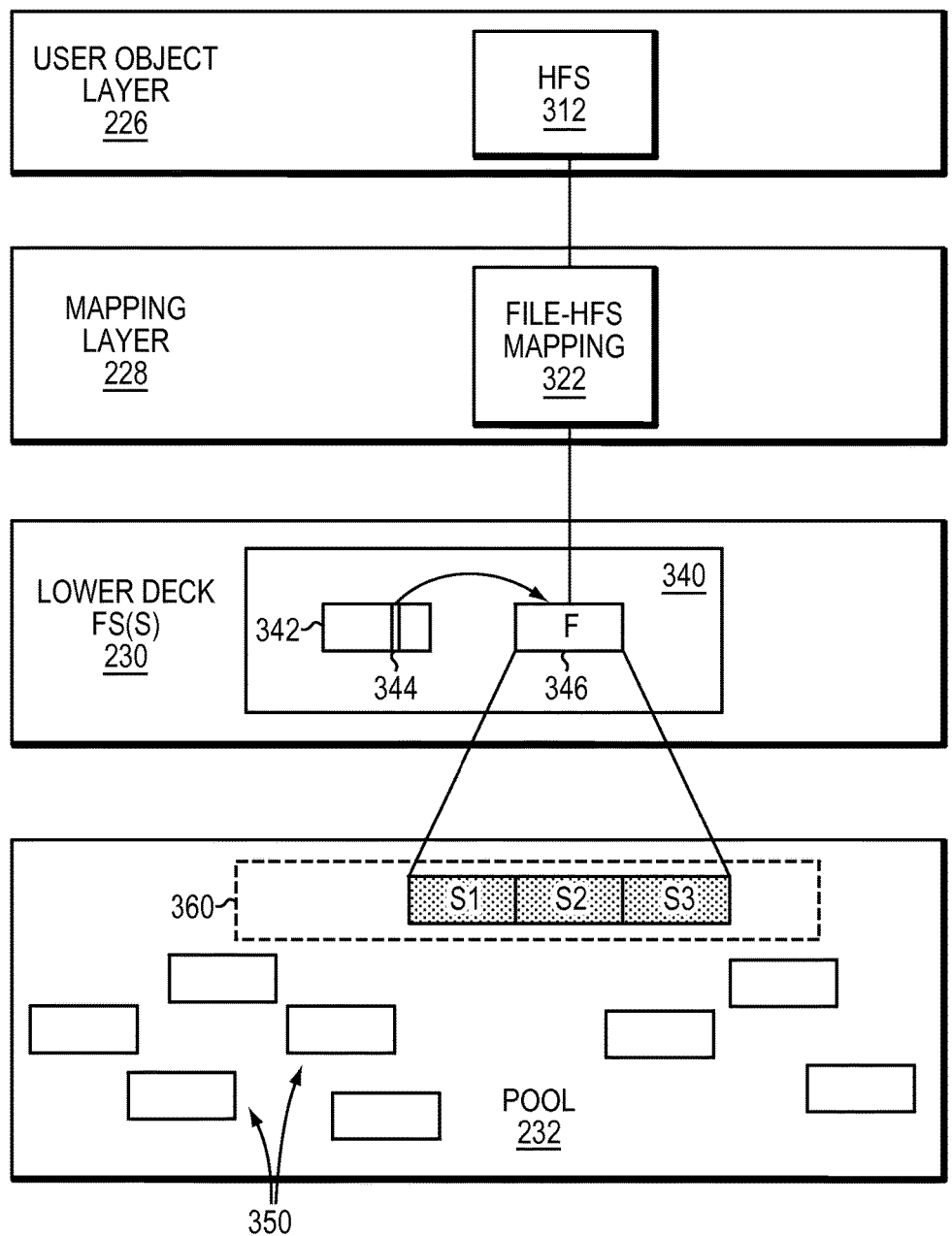
FIGS. 5-9 are diagrams illustrating in more detail components that may be used in connection with techniques herein.

FIG. 5 shows portions of the front end 142 in additional detail. Here, the user object layer 226 includes a representation of an HFS (host file system) 312, and the mapping layer 228 includes a file-to-HFS mapping 322. The file-to-HFS mapping 322 maps the HFS 312 to a file F (346). Through the file-to-HFS mapping 322, any file or directory of the HFS 312 is mapped to a corresponding set of blocks within the file 346.

The file 346 is included within a particular lower-deck file system 340. The lower-deck file system 340 includes an inode table 342. The inode table 342 provides information about files in the lower-deck file system 340 in the form of inodes. For example, the inode table 342 of the lower-deck file system 340 includes an inode 344 which provides file-specific information about the file 346. The information stored in each inode includes location information (e.g., data block locations) where the data of the respective file is stored, and may thus be accessed as metadata to identify the locations of the file 346.

Although a single file is shown for the lower-deck file system 340, it is understood that each of the lower-deck file systems 230 may include any number of files, each having its own entry in the respective inode table of its file system. Also, a lower-deck file system may store not only regular files such as the file F 346, but also snapshots (point-in-time copies, also called "snaps") of such files. In this context the original file (e.g., file F 346) is referred to as a "primary" file. For instance, the lower-deck file system 340 stores the primary file 346 along with a different file for every snap of that file (such snaps effectively forming snaps of the HFS 312).

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

As described more below, at least some of the lower-deck file systems 230 are associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 6:
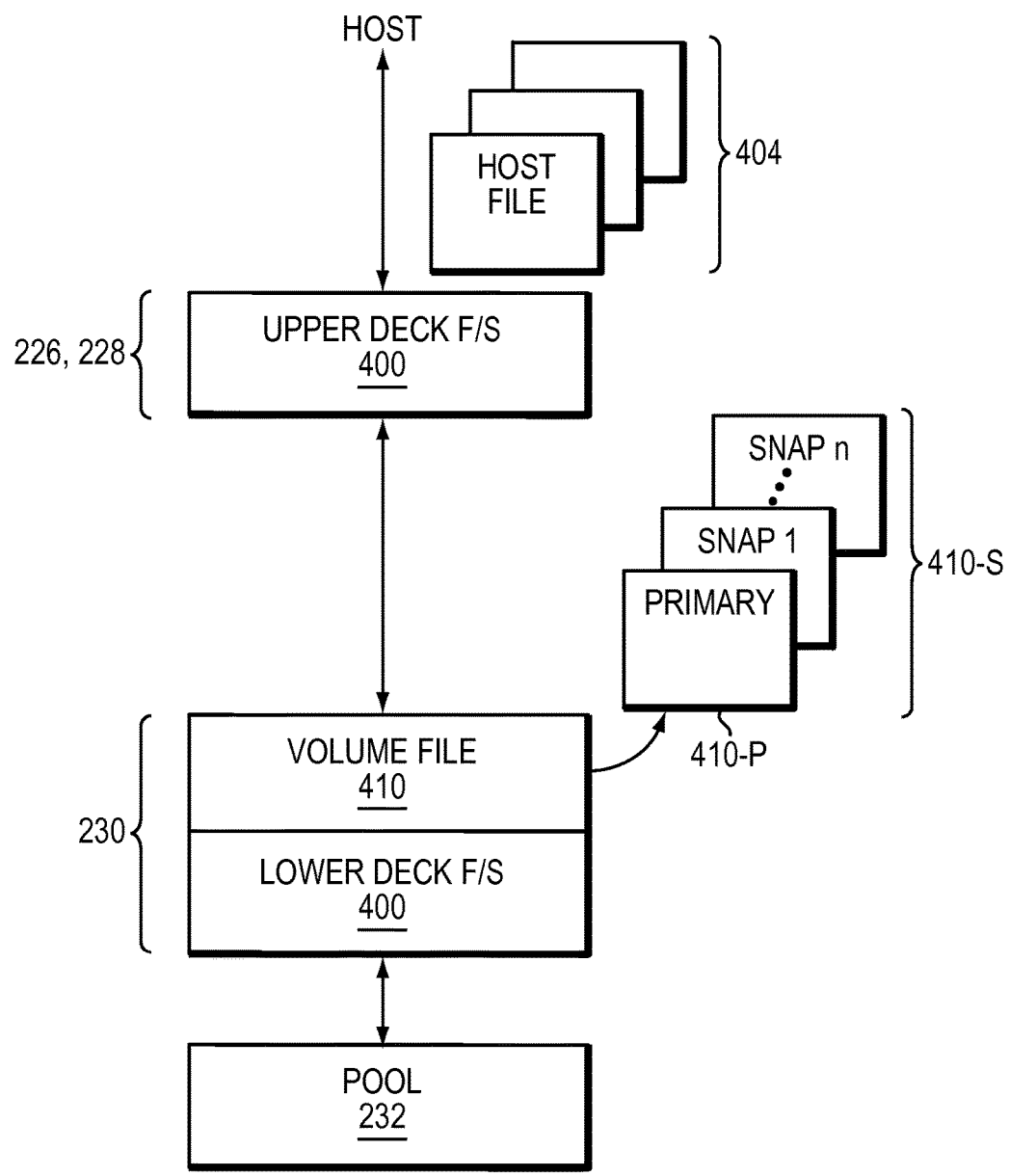

FIG. 6 shows another view of the organization of the data storage system useful for describing certain functionality as presented below. In FIG. 6, the user object and mapping layers 226, 228 include an upper-deck file system 400. As shown, the upper-deck file system 400 presents data in the form of host files 404 to a separate host computer (not shown). The lower-deck file system layer 230 includes a lower-deck file system 406. The lower-deck file system 406 presents a file referred to as a "volume file" 410 to the upper-deck file system 400. The volume file 410 may be the subject of point-in-time copying by which snapshots or "snaps" are created and used for various purposes. The active production file is referred to as the "primary" volume file 410-P, while the snaps are shown as snapshot files 410-S.

As described more below, the arrangement of FIG. 6 uses so-called "thin provisioning", which refers to the manner in which slices of the pool 232 become allocated or assigned to the upper-deck file system 400 as underlying physical storage for file contents. In the present description, "thin provisioning" includes the following features:

1. Underlying storage is not fully reserved, meaning that the configured size of the upper-deck file system 400 is greater than the amount of storage in the pool 232 reserved for use by the upper-deck file system 400 to the exclusion of other potential users (e.g., other file systems 230).

2. Underlying storage is dynamically allocated, meaning that slices from the pool 232 are assigned for actual use by the upper-deck file system 400 as its contents grow in response to the writing of data.

3. The volume file 410 is sparse, i.e., only incompletely containing actual underlying storage. Slices that are cut from the volume file 410 for use by the upper-deck file system 400 are actually thinly provisioned, and corresponding storage is allocated from the lower-deck file system 406 only when the volume file 410 is effectively written into by the upper-deck file system 400. Said differently, a slice may have been provisioned into the upper-deck file system 400 and yet have no storage associated to it from the lower-deck file system 406.

Figure 7:
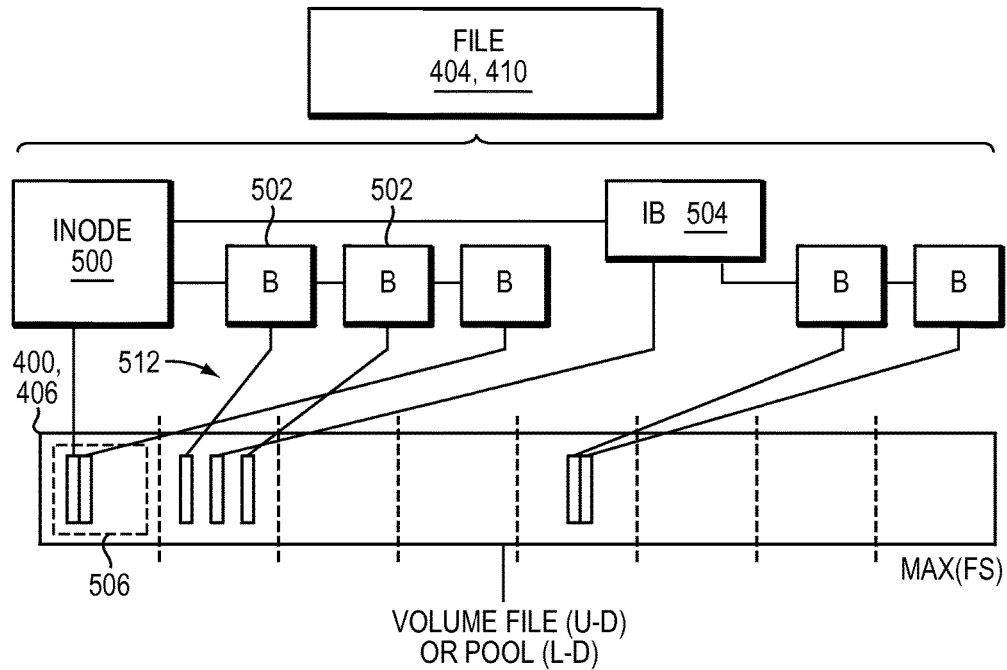

FIG. 7 illustrates certain details regarding files and file systems, applicable at both the upper layer (404, 400 in FIG. 6) and at the lower layer (410, 406) except for certain differences that are noted below. A file 404, 410 is shown as including an Inode 500 and a set of data blocks (B) 502. An indirect block (IB) 504 is also shown. All these items are included in the respective file system 400, 406, which in general will contain multiple files. Thus, the Inode 500 is part of an Inode structure 506 that includes Inodes of other files (not shown) as well as the indirect blocks 504. Additional details about the files 404, 410 and file systems 400, 406 are provided below.

Also shown in FIG. 7 is the relationship of the file 404, 410 to the respective file system. Each file system 400, 406 has a respective maximum size (as may be specified in blocks or bytes, for example) shown as Max(FS). At any given time there is an allocated size corresponding to the amount of underlying storage that is actually allocated for use.

The upper-deck file system 400 draws slices of storage from the volume file 410, while the lower-deck file system 406 draws slices directly from the pool 232. Of course, the volume file 410 is constituted by slices from the pool 232 via operation of the lower-deck file system 406. In many cases it will be desirable that slices defined at the upper level (upper-deck file system 400 and volume file 410) are of the same size, and aligned with, slices as defined in the pool 232 and used by the lower-deck file system 406. However, in general this is not required.

Returning to the files 404, 410, the Inode 500 contains direct pointers to some number of blocks 502 where file data is stored. If the file is sufficiently large, then one or more indirect blocks 504 are used. The Inode 500 contains pointers to the indirect block(s) 504, which in turn include pointers to additional data blocks 502. In typical file systems there may be at most three levels of indirection. In the description below, the term "IB tree" is used to refer to the entire set of IBs 504 and the Inode 500 for a given file.

FIG. 7 shows what is referred to as a "mapped" mode of operation of a file system 400, 406, in which a logical linear arrangement of blocks 502 viewed as a linear file are mapped to generally arbitrary locations as viewed in the address space of the file system 400, 406. For the upper-deck file system 400, mapped operation is essentially inherent, and there is no other mode. For the lower-deck file system 406, however, mapped mode is one of potentially multiple distinct operating modes, possible due to the internal nature and specialized use of the lower-deck file system 406 in the data storage system. The remaining description focuses on mapped mode operation of the lower-deck file system 406 in particular.

In FIG. 7 the mapping is indicated by generally crossing lines 512 extending between the blocks 502 of a volume file 410 and their locations in the lower-deck file system 406. In mapped mode, the lower-deck file system 406 assigns blocks 502 to regions of its address space in a generally arbitrary manner, at least among groups of blocks 502 that are stored at different times. That is, blocks 502 are assigned to areas of physical storage as the blocks 502 are initially written, and in general a group of blocks 502 being written together will occupy sequential block areas. However, the blocks 502 of one file are generally interspersed with those of other files, and as files grow new areas of physical storage are allocated that are generally not contiguous with or sequentially ordered relative to existing areas where blocks 502 of the file are already stored.

With respect to the lower-deck file system 406 in particular, mapped mode operation implies a generally arbitrary relationship between blocks of the volume file 410 presented to the upper-deck file system 400 and the blocks as stored in the lower-deck file system 406. To satisfy an I/O request directed to a given block of the volume file 410 generally requires that the lower-deck file system 406 examine (or "traverse") the inode 500 and IB(s) 504 to identify the location of the block within the lower-deck file system 406. This represents a performance penalty, albeit one that is normally deemed acceptable when thin provisioning is used. The tradeoff is one of I/O latency and throughput versus storage efficiency, i.e., efficient use of available physical storage from the pool 232. As described below, in some embodiments a technique may be employed for transitioning a file system to a direct operating mode in which predetermined calculations can be used instead of Inode/IB traversals.

It should also be noted that mapped mode of operation of the lower-deck file system 406 may include deduplication functionality by which duplicate blocks in a deduplication domain including the upper-deck file system 400 are stored as a single shared block and corresponding block pointers in the lower-deck file system 406.

Figure 8:
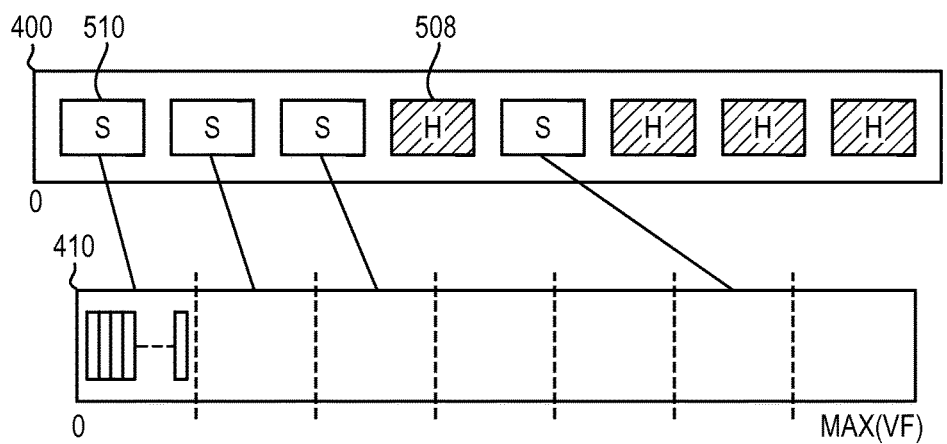

FIG. 8 illustrates the relationship between the upper-deck file system 400 and the volume file 410 presented by the lower-deck file system 406. Slices 510 are created from corresponding slice-size areas of the volume file 410, with a generally arbitrary mapping between their respective locations. Holes 508 are slice-size areas not currently provisioned. As the actual size of the upper-deck file system 400 increases, which is reflected in holes 508 being replaced with slices 510, the size of the volume file 410 is increased accordingly. This demand from the upper-deck file system 400 is passed down to the lower-deck file system 406, to which additional pool slices 350 are allocated to enable the lower-deck file system 406 to grow the size of the volume file 410 accordingly, and this additional space is used to add slices 510 to the upper-deck file system 400. As indicated, the volume file 410 has a maximum size shown as Max(VF). If demand by the upper-deck file system 400 surpasses this value, then subsequent file write operations from a host to the upper-deck file system 400 may be responded to with an out-of-space condition. In one embodiment, this may always occur. In another embodiment, this may be prevented by increasing Max(VF) and allocating additional storage from the pool 232 if available.

Slices 510 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs. The slice manager may be responsible for implementing a slice allocation policy and/or algorithm. For example, the slice manager may receive slice allocation requests, and maintain relevant statistical information regarding slices by using a slice allocation table.

Figure 9:
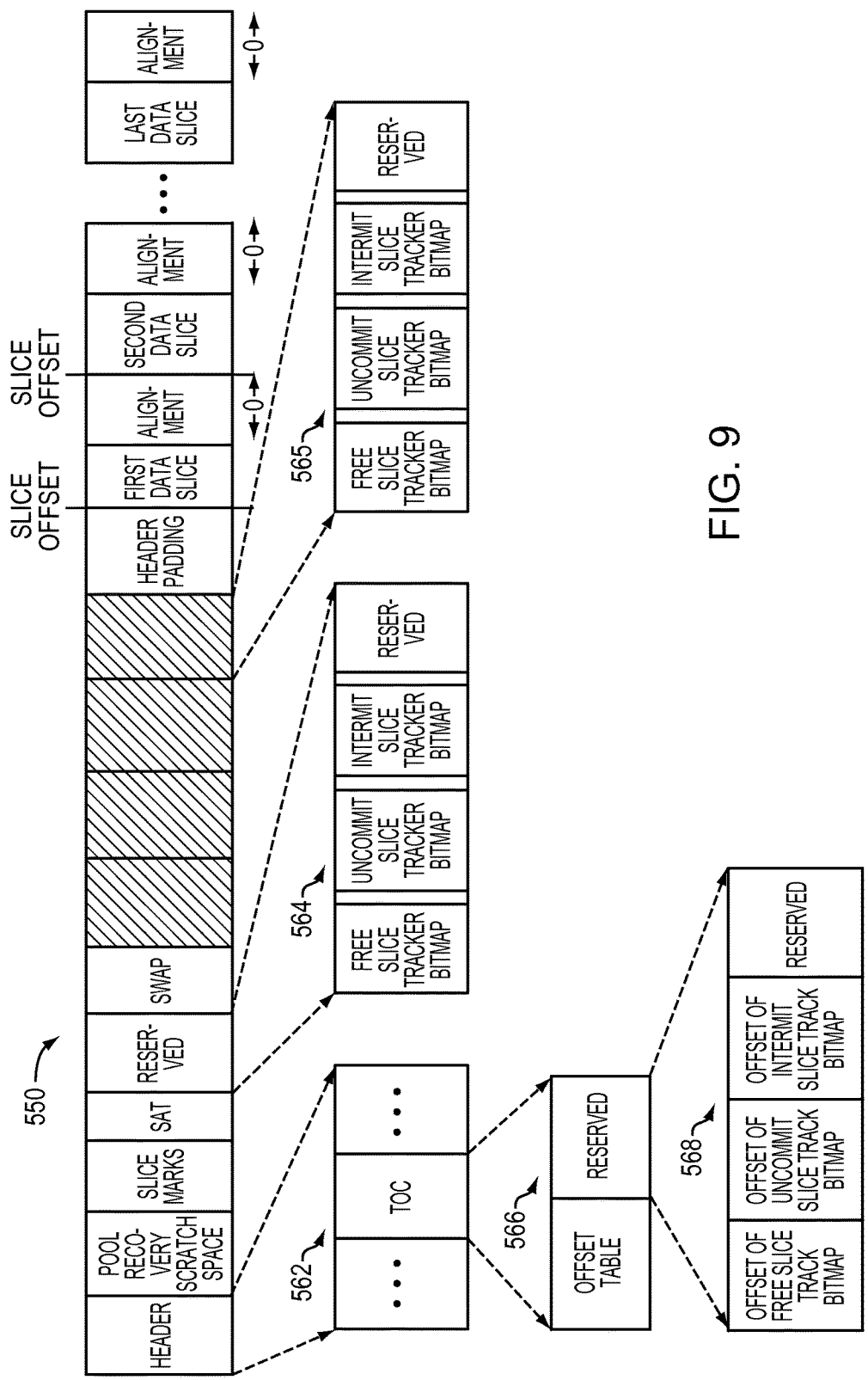

Referring to FIG. 9, shown is an example representation of a slice allocation table that may be included in an embodiment using the techniques described herein. In at least one embodiment of the current technique, on-disk layout for slice allocation table 550 is not changed for accommodating a set of bitmaps 564 for tracking the state of a slice during a slice operation. In at least one embodiment of the current technique, three new slice bitmaps are added to the slice allocation table 550. The first bitmap, a free slice bitmap, indicates whether a slice is available as a free slice in the SAT 550. Thus, if a bit of the free slice bitmap is set with a number value of 1, the bit indicates that a slice indicated by that bit is available as a free slice in the SAT 550. However, if a bit of the free slice bitmap is set with a number value of 0, the bit indicates that a slice indicated by that bit is not available as a free slice. The second bitmap, an uncommit slice bitmap, indicates whether a slice has been allocated to a file system or unprovisioned by the file system. Thus, if a bit of the uncommit slice bitmap is set with a number value of 1, the bit indicates that a slice indicated by that bit is available for provisioning to a file system. However, if a bit of the free slice bitmap is set with a number value of 0, the bit indicates that a slice indicated by that bit is not available for allocation to a file system. The third bitmap, an intermittent slice bitmap, indicates whether a slice operation has been started on a slice. Thus, if a bit of the intermittent slice bitmap is set with a number value of 1, the bit indicates that a slice operation has been started on a slice thereby making the slice an intermittent slice. However, if a bit of the intermittent slice bitmap is set with a number value of 0, the bit indicates that a slice operation has not been started on a slice thereby making the slice not an intermittent slice.

In at least one embodiment of the current technique, the three on-disk bitmaps indicated above are added in reserved area 564 of the on-disk layout of SAT 550. Each bitmap may be of a fixed size, for example, 2 Kilobytes (KB). In at least one embodiment of the current technique, a set of bitmaps 564 are created when a first logical unit is added to a storage pool such that bits corresponding to free slices in the storage pool are set to 1 in the free slice bitmap and bits in the uncommit slice bitmap and intermittent slice bitmap are initialized to the value of "0". When a process such as slice relocation, slice evacuation, or shrink starts, bits corresponding to slices on which slice operations has started are marked as intermittent slices in the intermittent slice bitmap. In such a case, when the process such as slice relocation, slice evacuation, or shrink finishes, bits corresponding to the slices on which the slice operations has finished are cleared and set to the value of "0". Thus, in at least one embodiment of the current technique, a replication process may execute on a file system without having to pause the replication process when snapshot copies of the file system are created. Thus, a slice that is undergoing an update based on a slice operation being performed on the slice may be tracked using the intermittent slice bitmap. Thus, when a snapshot copy of a file system is mounted and/or accessed, an inconsistency between a SAT and mapping information of the file system may be recovered using information from the intermittent slice bitmap.

In at least one embodiment of the current technique, the intermittent slice bitmap is evaluated when a file system is mounted and/or accessed. If each bit of the intermittent slice bitmap is cleared with a value of "0" indicating that no slice is in an intermittent state, the file system is mounted and/or accessed successfully. However, upon evaluation of the intermittent slice bitmap, if it is determined that a set of bits of the intermittent slice are set with a value of "1" indicating that slices corresponding to the set of bits are in an intermittent state, the slices are recovered to a consistent state by performing following steps described below herein. A return value of each intermittent slice identified by the intermittent slice bitmap is evaluated. All such intermittent slices are marked such that no data movement occurs on the intermittent slices. A sparse volume manager releases slices on which a slice operation has been finished.

In at least one embodiment of the current technique, a function is invoked to evaluate whether a slice relocation process has relocated the last slice. If the last slice has been relocated, no recovery is required. If the last slice has been relocated but not removed from a sparse volume, the slice is removed from the sparse volume and marked as a free slice and released from a slice manager component. If the last slice has been relocated and removed from a sparse volume, the slice is marked as a free slice and released from a slice manager component.

Thus, in at least one embodiment of the current technique, when a snapshot copy of a file system is created and mounted, the intermittent bitmap is evaluated to determine a set of slices that have been marked as intermittent slices. Based on the set of slices identified as intermittent slices, SAT pages corresponding to such slices are loaded in a memory of a system. Based on the information retrieved from the SAT, each slice identified as an intermittent slice is recovered. For example, an intermittent slice may be a slice on which a slice relocation operation has started but not finished.

Figure 10:
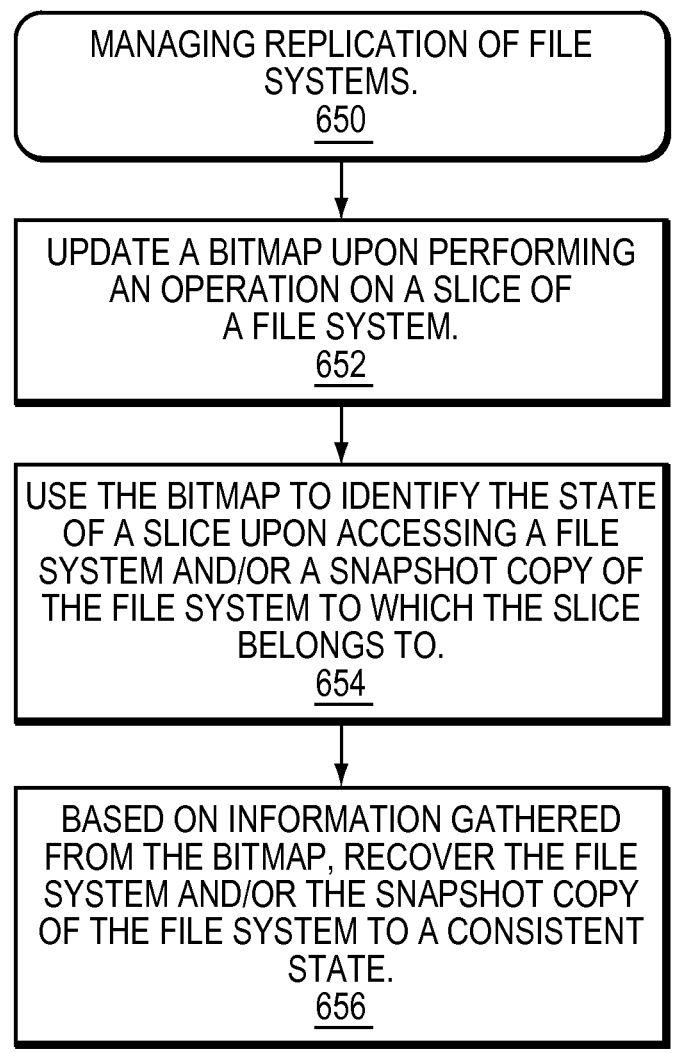
FIG. 10 is a flow diagram illustrating processes that may be used in connection with techniques herein.

Referring to FIG. 10, shown is a more detailed flow diagram illustrating managing replication of file systems. With reference also to FIGS. 1-9, replication of a file system is managed in a storage system (step 650). A set of bitmaps are updated upon performing an operation on a slice of a file system (step 652). The set of bitmaps are used to identify state of slices that may be in an intermittent state upon accessing a file system and/or a snapshot copy of the file system (step 654). Based on the information gathered from the set of bitmaps, the file system and/or the snapshot copy of the file system is recovered to a consistent state when a storage system reboots after a failover (step 656).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing replication of file systems, the method comprising:
    updating information stored in a set of bitmaps associated with a set of slices of a file system upon performing an operation on a slice of the file system, wherein the file system includes the set of slices, wherein the information stored in the set of bitmaps indicates whether a slice of the set of slices is in an intermittent state; and
    using the information stored in the set of bitmaps for recovering the file system to a consistent state.

2. The method of claim 1, wherein the set of bitmaps includes an intermittent slice bitmap, each bit of the intermittent slice bitmap tracks whether a slice operation has started on a slice of the set of slices and has not finished.

3. The method of claim 2, further comprising:
    updating the intermittent slice bitmap upon starting performing the operation on each slice of the set of slices of the file system and upon finishing performing the operation on each slice of the set of slices of the file system;
    using the intermittent slice bitmap for identifying the state of each slice of the set of slices;
    based on the state of each slice of the set of slices, recovering the file system upon reboot of a storage system.

4. The method of claim 1, wherein recovering the file system includes removing inconsistency between a slice allocation table and mapping information included in the file system.

5. The method of claim 1, wherein the file system is associated with a set of sparse volumes.

6. The method of claim 1, wherein a file system includes a set of slices, each slice of the set of slices is a logical representation of a subset of physical disk storage.

7. The method of claim 1, wherein the file system resides on a storage system, wherein the storage system includes a disk drive system comprising a plurality of Redundant Array of Inexpensive Disks (RAID) systems, each RAID system of the plurality of RAID systems having a first disk drive and a second disk drive.

8. The method of claim 1, further comprising:
    recovering a snapshot copy of the file system upon reboot of a storage system after a replication facility creates the snapshot copy.

9. The method of claim 1, wherein the set of slices provisioned to the file system are managed by a slice allocation table.

10. The method of claim 1, further comprising:
    avoid pausing a slice operation on the file system upon creating a snapshot copy of the file system.

11. A system for use in managing replication of file systems, the system comprising a processor configured to:
    update information stored in a set of bitmaps associated with a set of slices of a file system upon performing an operation on a slice of the file system, wherein the file system includes the set of slices, wherein the information stored in the set of bitmaps indicates whether a slice of the set of slices is in an intermittent state; and
    use the information stored in the set of bitmaps for recovering the file system to a consistent state.

12. The system of claim 11, wherein the set of bitmaps includes an intermittent slice bitmap, each bit of the intermittent slice bitmap tracks whether a slice operation has started on a slice of the set of slices and has not finished.

13. The system of claim 12, further comprising:
    update the intermittent slice bitmap upon starting performing the operation on each slice of the set of slices of the file system and upon finishing performing the operation on each slice of the set of slices of the file system;
    fourth logic using use the intermittent slice bitmap for identifying the state of each slice of the set of slices;
    recover, based on the state of each slice of the set of slices, the file system upon reboot of a storage system.

14. The system of claim 11, wherein recovering the file system includes removing inconsistency between a slice allocation table and mapping information included in the file system.

15. The system of claim 11, wherein the file system is associated with a set of sparse volumes.

16. The system of claim 11, wherein a file system includes a set of slices, each slice of the set of slices is a logical representation of a subset of physical disk storage.

17. The system of claim 11, wherein the file system resides on a storage system, wherein the storage system includes a disk drive system comprising a plurality of Redundant Array of Inexpensive Disks (RAID) systems, each RAID system of the plurality of RAID systems having a first disk drive and a second disk drive.

18. The system of claim 11, further comprising:
    recover a snapshot copy of the file system upon reboot of a storage system after a replication facility creates the snapshot copy.

19. The system of claim 11, wherein the set of slices provisioned to the file system are managed by a slice allocation table.

20. The system of claim 11, further comprising:
    pause a slice operation on the file system upon creating a snapshot copy of the file system.

* * * * *